United States Patent [19]

Early

[11] Patent Number: 4,958,921
[45] Date of Patent: Sep. 25, 1990

[54] LIGHT-DRIVEN PHASE SHIFTER

[75] Inventor: James W. Early, Los Alamos, N. Mex.

[73] Assignee: The United States of America as represented by the United States Department of Energy, Washington, D.C.

[21] Appl. No.: 909,746

[22] Filed: Sep. 19, 1986

[51] Int. Cl.$^5$ .......................... G02B 5/172; G02B 6/36
[52] U.S. Cl. .............................. 350/354; 350/162.11; 350/484; 455/611
[58] Field of Search .................. 350/162.11, 354, 484; 455/611; 332/7.51

[56] References Cited

U.S. PATENT DOCUMENTS

| | | | |
|---|---|---|---|
| 3,790,252 | 2/1974 | Pao | 350/354 |
| 4,209,690 | 6/1980 | Rentzepis | 332/7.51 |
| 4,508,431 | 4/1985 | Henshaw | 350/354 |
| 4,540,244 | 9/1985 | Sincerbox | 350/354 |
| 4,544,898 | 10/1985 | Pernich | 332/751 |
| 4,585,301 | 4/1986 | Bialkowski | 350/354 |
| 4,597,638 | 7/1986 | Chemla | 350/354 |
| 4,626,075 | 12/1986 | Chemla | 350/354 |
| 4,630,898 | 12/1986 | Jewell | 350/354 |
| 4,632,518 | 12/1986 | Jensen | 350/354 |

OTHER PUBLICATIONS

Gagne et al., "Photorefractive Deflection . . . Beams", 9/86, Can. J. Phys., vol. 64, #9, pp. 1116–1120, Abst. Only.

*Primary Examiner*—Nelson Moskowitz
*Attorney, Agent, or Firm*—Ray G. Wilson; Paul D. Gaetjens; William R. Moser

[57] ABSTRACT

A light-driven phase shifter is provided for modulating a transmission light beam. A gaseous medium such as argon is provided with electron energy states excited to populate a metastable state. A tunable dye laser is selected with a wavelength effective to deplete the metastable electron state and may be intensity modulated. The dye laser is directed through the gaseous medium to define a first optical path having an index of refraction determined by the gaseous medium having a depleted metastable electron state. A transmission laser beam is also directed through the gaseous medium to define a second optical path at least partially coincident with the first optical path. The intensity of the dye laser beam may then be varied to phase modulate the transmission laser beam.

7 Claims, 1 Drawing Sheet

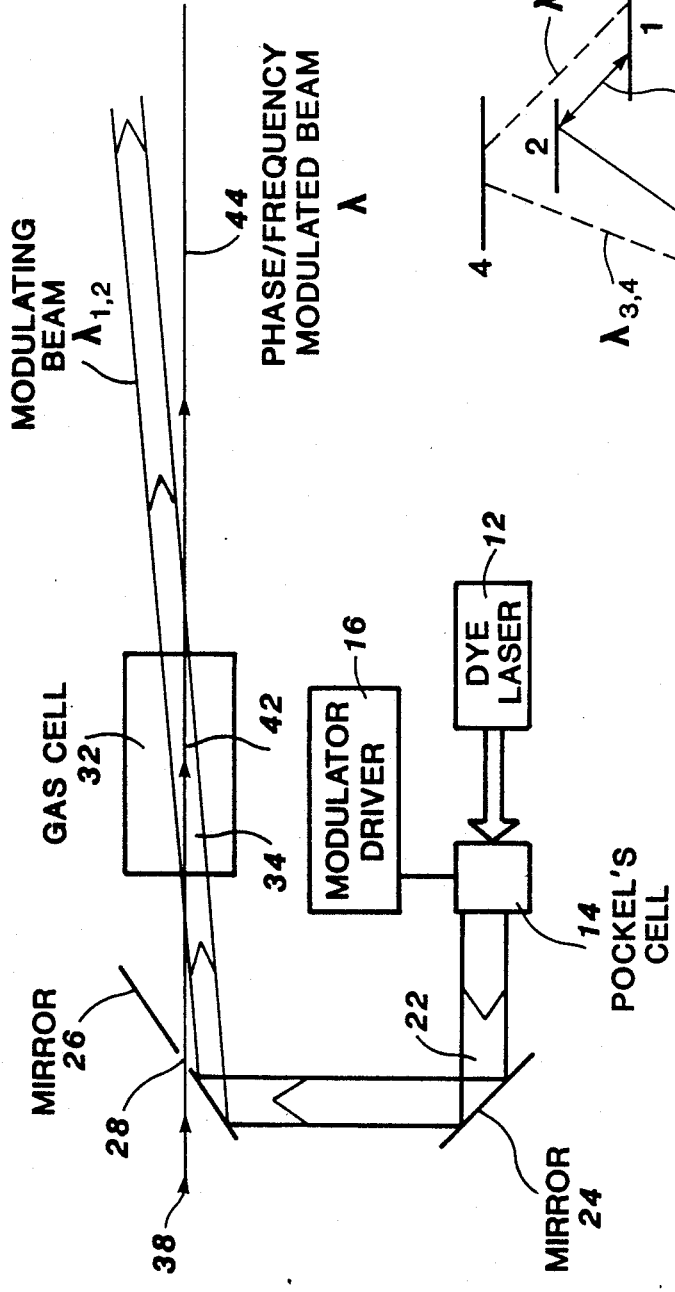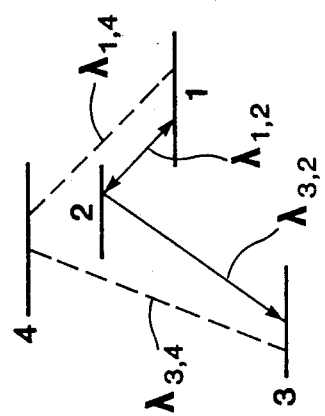

LIGHT-DRIVEN PHASE SHIFTER

BACKGROUND OF THE INVENTION

This invention generally relates to modulating a carrier wave for signal transmission and, more particularly, to phase/frequency shifting a light beam for use in optical signal transmission. This invention is the result of a contract with the Department of Energy (Contract No. W-7405-ENG-36).

Electromagnetic radiation in the optical frequency range is being increasingly used as a carrier signal for information transmission. Electromagnetic carrier signals may typically be amplitude modulated or frequency modulated to transmit information with the carrier. Where the carrier is a light beam, various electrooptic devices have been used to modulate the carrier signal. It will be understood that frequency modulation involves a frequency change or phase shift in the carrier signal.

One conventional device for intensity, or amplitude, modulating a light beam is a Pockels cell. Crystals are provided which undergo a change in the refractive characteristics in an applied electric field. A relatively high voltage driver is required to activate the crystals. Further, carrier intensity is limited by temperature sensitivity of the crystals which exhibit the Pockels effect and the carrier signal may be attenuated while traversing the modulator. Further, the crystal response times are limited, thereby limiting the information content which can be transmitted and the rise time pulse capability.

Yet another modulating device for light beams uses the Faraday effect. In this effect the polarization of a light beam can be rotated when it passes through material in the direction of an applied magnetic field. With the magnetic field the operating frequencies and pulse rise times are limited by inductive affects. Again, the carrier light beam is limited in power and information-carrying capability.

These and other problems of the prior art are addressed by the present device and an improved light beam carrier phase shifter is provided for signal carrier transmission. Accordingly, one object of the present invention is to obtain a wide range of signal modulation capability.

Another object of the present invention is to decrease the rise time for a modulating pulse.

Yet another object is to enable increased power capability for the carrier signal.

One other object is to enable relatively low-voltage drivers to be used in the modulating system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a light-driven phase shifter. A modulating chamber is provided having a gas with at least three electron energy states including a ground state, a metastable state, and a transition state having a transition energy from the metastable state which corresponds to a first light wavelength. A first light means illuminates the modulating chamber with modulating light at the first wavelength along a first beam path, the first beam path defining a volume of the gas having an index of refraction determinable by an intensity of the first light beam. A second light beam then illuminates the modulating chamber with a transmission light beam along a second beam path traversing at least a portion of the first beam path. Means for varying the intensity of the first light beam is provided which is effective to vary the gas index of refraction for phase shifting the transmission light beam.

In another characterization of the present invention, a light-driven phase shifter is provided having a gas volume with a medium excitable by a selected wavelength light to a transition state. Modulating means forms a first path of the light at the selected wavelength at a variable intensity through the gas volume. A transmission means forms a second path of a second light at a selectable frequency through the gas volume and at least partially coincident with the first light path.

In one other characterization of the present invention, a light-driven phase shifter is provided with a first laser means having a selected wavelength light for defining an optical path with a Variable index of refraction functionally related to an intensity of the selected wavelength light. A second laser means is aligned to traverse at least a portion of the optical path for phase shifting by the variable index of refraction.

Still another characterization of the present invention includes a light-driven phase shifter with a medium having at least three electron energy states with relative populations functionally related to an exciting laser intensity. Modulating means generates the exciting laser with a variable intensity to define a first light path within the medium. Signal carrier means generates a second laser along a second light path which is at least partially coincident with the first light path for introducing a phase shift by varying the medium index of refraction as the relative state populations vary with the intensity of the exciting laser along the first light path.

BRIEF DESCRIPTION OF THE DRAWINGS

The accompanying drawings, which are incorporated in and form a part of the specification, illustrate the embodiment of the present invention and together with the description, serve to explain the principles of the invention. In the drawings:

FIG. 1 is a representative three level electron state diagram.

FIG. 2 is a schematic representation of a light driven phase shifter according to one embodiment of the present invention.

DETAILED DESCRIPTION OF THE INVENTION

In a preferred embodiment of the present invention a phase shifter is provided for a light beam carrier signal where the phase shift is based on the variation of the refractive index of a gas medium by use of resonant laser light to alter the electron energy state populations of the gas atoms. The index of refraction of the gas medium is functionally related to the electron populations of the energy state levels available for the gas.

These populations are, in turn, determined by the intensity of an exciting light beam. The exciting light beam frequency is selected to move electrons from a metastable state to a transition state which decays to a ground state. Thus, the population levels, and hence the index of refraction. can be modulated by varying the intensity of the modulating light beam.

The wavelength of a second light beam incident on the excited gas medium is inversely related to the index of refraction. Hence, as hereinafter described, the number of wavelengths along a predetermined path including the excited gas will vary as the wavelength varies, inducing a phase shift through the gaseous path traversed by the second light beam. Further, if the index of refraction is now varied with time a frequency shift in the second light beam can be induced to frequency modulate the second beam.

PHASE SHIFT

It can be shown that a light beam passing through a medium can be phase and frequency shifted by varying the index of refraction of the medium. Let:

L = length of optical path in medium;
$\lambda$ = vacuum wavelength of light beam;
n = index of refraction of medium;
$N_\lambda$ = number of wavelengths within gas cell;
$\lambda$ = wavelength in medium = $\lambda/n$ Then, $$N_\lambda = \frac{L}{\lambda} = \frac{nL}{\lambda}$$

$$\Delta N_\lambda = \frac{L}{\lambda} \Delta n$$

The phase change, $\Delta \phi$, along one wavelength is $2\pi$ radians, or $\Delta \phi = 2\pi \Delta N_\lambda'$.

Along the medium.

$$\phi_{out} - \phi_{in} = 2\pi \Delta N_\lambda = \frac{2\pi L}{\lambda} \Delta n$$

$$\frac{d\phi_{out}}{dt} - \frac{d\phi_{in}}{dt} = \omega_{out} - \omega_{in}$$
$$= 2\pi \nu_{out} - \nu_{in}$$
$$= 2\pi \Delta \nu$$

where
$\omega$ = angular speed
$\nu$ = frequency

Therefore, $$\Delta \phi = \frac{2\pi L}{\lambda} \Delta n \qquad (1)$$

and $$\Delta \nu = \frac{L}{\lambda} \frac{\Delta n}{\Delta t} \qquad (2)$$

REFRACTIVE INDEX VARIATION

Referring first to FIG. 1 there is depicted a simplified energy level diagram of an element having four electron states. A suitable gas medium has at least a metastable state (level 1). a transition state (level 2). and a ground state (level 3). One or more alternate energy levels (e.g. level 4) may be available, but with a relatively stable population, as herein described. Electrons may move between level 1 and level 2 by excitation and by decay and from level 2 to level 3 by decay. Likewise, electrons may be moved from level 3 ground state to level 1 metastable state by radio frequency or dc excitation. It should be appreciated that at least a three-state system is required to obtain variable state populations since the state populations in a two-state system tend to equalize as the absorbing state obtains a substantially steady state condition. As shown in FIG. 1, a state change from level 1 to level 2 can be produced by supplying light at wavelength at $\lambda_{1,2}$ providing photons at an energy corresponding to the difference in energy between level 1 and level 2.

Assuming initially that all atoms are in the metastable state (level 1) the refractive index is now expressed as:

$$n^2(\lambda) = 1 + \frac{Ne^2}{8\pi^2 \epsilon_0 mc^2} \sum_n \frac{\xi_1 f_{1n}}{\lambda_{1n}^{-2} - \lambda^{-2}} \qquad (3)$$

where
$f_{1n}$ = oscillator strength of transitions connecting metastable state 1 with higher state levels
$\lambda_{1n}$ = wavelength of transition
$\lambda$ = wavelength of light at which the refractive index is being measured
$\xi_1$ = fraction of atoms in state 1
N = number density of atoms in gas or vapor
$\epsilon_O$ = Permittivity of free space
e = electron charge
m = electron mass
c = speed of light in vacuum This conventional formulation is derived from the response of an atomic dipole oscillator of resonance wavelength, $\lambda_N$, to electromagnetic radiation of wavelength, $\lambda$. The summation in Equation 3 is over all possible transitions between the metastable state (level 1) and higher levels, such as level 2 and level 4. Transition energy wavelengths are labeled $\lambda_{ln}$, where the first indice designates the lower state and the second indice designates the upper level.

If laser light of wavelength $\lambda_{1,2}$ is applied, resonant with a transition energy from a metastable state (level 1) to a higher level transition, the higher transition will be populated. In the example, the exciting laser light has a wavelength $\lambda_{1,2}$ to cause level 2 to be populated. Further, if level 2 has a short lifetime. i.e., several nanoseconds, and a strong decay path to the ground state (level 3). an inversion occurs wherein the metastable state (level 1) is depleted and the ground state (level 3) is populated.

The net result of this application of resonant wavelength light $\lambda_{1,2}$ from a laser is the depletion of the metastable state and the production of a gaseous medium in which all of the atoms exposed to the exciting laser light are now returned to the ground state. The rate of this depletion process is a function of the intensity of the laser light and the transition rate between levels 2 and 3. With all of the atoms now in a ground state along the path of the exciting laser light. the index of refraction can now be written as:

$$n_1^2(\lambda) = 1 + \frac{Ne^2}{8\pi^2 \epsilon_0 mc^2} \sum_m \frac{\xi_3 f_{3m}}{\lambda_{3m}^{-2} - \lambda^{-2}} \qquad (4)$$

where
$\xi_3$ = fraction of atom in state 3

$f_{3,m}$ = oscillator strengths of transitions from level 3 to higher levels $\lambda_{3,m}$ = wavelength of transitions from level 3 to higher levels.

Equation 4 can be simplified since $n^2$ is typically very close to 1:

$$n_0 = 1 + \frac{Ne^2}{16\pi^2 \epsilon_0 mc^2} \sum_n \frac{\xi_1 f_{1n}}{\lambda_{1n}^{-2} - \lambda^{-2}} \quad \text{Laser Light OFF} \tag{5}$$

$$n_1 = 1 + \frac{Ne^2}{16\pi^2 \epsilon_0 mc^2} \sum_m \frac{\xi_3 f_{3m}}{\lambda_{3m}^{-2} - \lambda^{-2}} \quad \text{Laser Light ON} \tag{6}$$

The total change in the refractive index between laser light OFF and laser light ON is given by:

$$\Delta n = \tag{7}$$

$$n_0 - n_1 = \frac{Ne^2}{16\pi^2 \epsilon_0 mc^2} \left[ \sum_n \frac{\xi_1 f_{1n}}{\lambda_{1n}^{-2} - \lambda^{-2}} - \frac{\xi_3 f_{3m}}{\lambda_{3m}^{-2} - \lambda^{-2}} \right]$$

$$= \frac{\lambda \Delta N_\lambda}{L} \text{ (as previously shown)}.$$

It should be noted that there may exist many metastable levels other than metastable level 1, but their contribution to the change in refractive index cancel since the state populations are unaltered where the incident laser light is not resonant with a transition energy. Thus, the problem is reduced to a simple three-level system.

To show the dependence of the index of refraction on incident light intensity. Equation 7 can be further reduced:

Since $\xi_1 + \xi_3 = 1$ (only levels 1 and 3 can be populated significantly)

$\xi_3 = 1 - \xi_1$, substituting into Equation 7 gives $$\Delta N_\lambda = \frac{-L}{\lambda} \frac{Ne^2}{16\pi^2 \epsilon_0 mc^2} \left[ \sum_N \frac{f_{3m}}{\lambda_{3m}^{-2} - \lambda^{-2}} - \xi_1 \left( \sum_n \frac{f_{1n}}{\lambda_{1n}^{-2} - \lambda^{-2}} + \sum_m \frac{f_{3m}}{\lambda_{3m}^{-2} - \lambda^{-2}} \right) \right] \tag{8}$$

Since $\xi_1$ and $\xi_3$ are time dependent, we can differentiate to get phase shift/unit time:

$$\frac{dN_\lambda}{dt} = \frac{L}{\lambda} \frac{Ne^2}{16\pi^2 \epsilon_0 mc^2} \left[ \frac{d\xi_1(t)}{dt} \left( \sum_n \frac{f_{1n}}{\lambda_{1n}^{-2} - \lambda^{-2}} + \sum_m \frac{f_{3m}}{\lambda_{3m}^{-2} - \lambda^{-2}} \right) \right] \tag{9}$$

To determine the rate of change of the relative population of the metastable state (level 1), recall that:

$\xi_1 + \xi_2 + \xi_3 = 1$ where $\xi_1$, $\xi_2$, $\xi_3$ are the population factors for the three-level problem. Differentiating and recombining terms $$\frac{d\xi_1}{dt} = -\left( \frac{d\xi_2}{dt} + \frac{d\xi_3}{dt} \right) \tag{10}$$

Also, $$\frac{d\xi_2}{dt} = \xi_1 \omega B_{12} - \xi_2 A_{21} - \xi_2 A_{23} - \frac{g_2}{g_1} \xi_2 \omega B_{21} \tag{11}$$

where $\xi_1 \omega B_{12}$ = rate of pumping atoms from state 1 to state 2 through stimulated absorption $\xi_1$ = fractions of atoms in state 1

$\omega$ = power density of applied laser light $B_{12}$ = Einstein B coefficient for stimulated absorption $A_{21}\xi_2$ = rate of decay of level 2 back to ground state 1

$A_{21}$ = decay rate for 2→1 transition $\xi_2$ = fraction of atoms in state 2

$A_{23}\xi_2$32 rate of decay of level 2 to level 3

$A_{23}$ = decay rate of 2→3 transition $\frac{g_2}{g_1} \xi_2 \omega B_{21}$

= rate of stimulated emission from level 2 to level 1

$B_{21}$ = Einstein B coefficient for stimulated emission $g_1, g_2$ = degeneracy factors and, $$\frac{d\xi_3}{dt} = \xi_2 A_{23} \text{ or } \xi_2 = \frac{1}{A_{23}} \frac{d\xi_3}{dt} \tag{12}$$

Substituting Equation 11 and Equation 12 into Equation 10, and rewriting, gives:

$$\frac{d\xi_1}{dt} = -\xi_1 \omega B_{12} + \frac{A_{21}}{A_{23}} \frac{d\xi_3}{dt} - \frac{g_1}{g_2} \left( \frac{d\xi_3}{dt} \right) \frac{\omega B_{21}}{A_{23}} \tag{13}$$

Typically, $A_{21} \ll A_{23}$ and $\omega B_{21} \ll A_{23}$, and Equation 13 simplifies to:

$$\frac{d\xi_1}{dt} = -\xi_1 \omega B_{12} \tag{14}$$

Now the exciting laser light of wavelength $\lambda_{1,2}$ is depleting the metastable state (level 1) at a rate equal to the absorption rate of the laser light.

Then, $\omega = \frac{g(\nu) \bar{I}}{A_{21} c}$, where $\bar{I}$ = time averaged laser light intensity $g(\nu)$ = homogeneously broadened linewidth $$= \frac{A_{21}}{2\pi \left[ \Delta \nu^2 + \left( \frac{A_{21}}{2} \right)^2 \right]} = \frac{2}{\pi A_{21}} \text{ at resonance } (\Delta \nu = 0).$$

Also, $\frac{B_{12}}{A_{21} c} = \frac{\lambda^3 A_{21}}{4hc}$, where $\lambda$ = center wavelength of applied laser light.

h = Planck's constant
Substituting into Equation (14).

$$\frac{d\xi_1}{dt} = -\xi_1 \frac{\lambda^3}{2\pi hc} I \quad (15)$$

Thus, the rate of change of the leVel 1 population decreases linearly with the intensity of the applied laser light. It will be appreciated that the length of the optical path does not become a factor since the laser beam "burns" a hole through the absorbing medium where the absorption state is depleted. Thus, the absorption length of the medium for the exciting laser light becomes relatively long and long gas cell lengths can be used.

The final expression for the change in phase with time is then given by substituting Equation (15) into the basic phase change formula. Equation (1):

$$d\phi = 2\pi \frac{dN_\lambda}{dt} = \frac{L}{\lambda} \frac{Ne^2}{8\pi\epsilon_0 mc^2} \left[ \xi_1 \frac{\lambda^3}{2\pi hc} \right] \left[ \sum_n \frac{f_{1n}}{\lambda_{1n}^{-2} - \lambda^{-2}} + \sum_m \frac{f_{3m}}{\lambda_{3m}^{-2} - \lambda^{-2}} \right] \cdot I \quad (16)$$

DETAILED DESCRIPTION OF THE PREFERRED EMBODIMENT

Referring now to FIG. 2, there is shown a phase shifting modulator in block diagram form. A first light source 12, which is preferably a tunable dye laser, is provided as a modulating light beam. Dye laser 12 is selected for resonance with a metastable-transition state energy difference for the gas in gas volume 32. Pockels cell 14 is driven by modulator driver 16 to vary the intensity of the output of dye laser 12.

The variable intensity output laser beam 22 may then be directed through gas cell 32 by reflection from mirror 24 and mirror 26 and hence through gas volume 32. A suitable gas cell 32 would have a length of about 10 cm with windows at each end, using a suitable excitable gaseous medium selected from the noble gases, e.g., argon. The gaseous medium defines a first index of refraction when the medium has been excited to populate the metastable state and when output laser beam 22 is OFF.

When output laser beam 22 is ON, beam 22 with a wavelength of $\lambda_{1,2}$ defines a first optical path 34 through gas cell 32. The energy states of gas atoms along first optical path 34 are populated and define a second index of refraction along first optical path 34, as hereinabove described. Diffusion of the gas atoms within gas cell 32 provides a resupply of gas with a populated metastable state when laser beam 22 is OFF.

A second light beam 38 may now be transmitted through an opening 28 in mirror 26 and through gas cell 32. The second light beam 38 is a signal carrier beam which has a wavelength different than modulating laser beam 22 and may be of relatively high power for transmission over long distances. First optical path 34 is slightly axially divergent from second optical path 42 such that second optical path 42 is preferably within first optical path 34 when traversing gaseous medium 32.

The intensity of modulating light beam 22 varies the index of refraction of gas cell 32 along first optical path 34. This variation is a high frequency response and enables a pulsed phase shift to be obtained having short rise times. Further, conventional modulators such as the pockels cell or a Faraday effect device have limited phase modulation of one radian or less. Apparatus herein described is expected to have a phase modulation capability of 10-100 radians. The transmitter light beam, or carrier signal light beam 38, is then phase shifted and hence frequency modulated by intensity modulation of modulating laser light beam 22.

Then, poWer absorption within gas cell 32 is only from the modulating light beam 22, which may be relatively low power. Further, the stare transitions of the gas atoms occur in a time which is short relative to the desired modulation to enable modulation in the 1 μsec time frame. A high power, high frequency optical signal system is provided.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiment were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A light driven phase shifter, comprising:
   a modulating chamber having a gas with at least three electron energy states including a ground state, a metastable state, and a transition state having a transition energy from said metastable state, corresponding to a first light wavelength;
   first light means for illuminating said modulating chamber with modulating light at said first wavelength along a first beam path, said first beam path defining a volume of said gas having an index of refraction determinable by an intensity of said first light means;
   second light means for illuminating said modulating chamber with a transmission light beam along a second beam path traversing at least a portion of said first beam path; and
   means for varying said intensity of said first light means effective to vary said gas index of refraction for phase shifting said transmission light.

2. A phase shifter according to claim 1, wherein said means for varying said intensity includes a Pockel's cell.

3. A phase shifter according to claim 1, wherein said first light means is a dye laser.

4. A light driven phase shifter, comprising:
   a gas volume having a medium excitable by a selected wavelength light to a transition state;
   said gas medium having at least three energy states including a ground state, a metastable state, and said transition state, where said transition state has an energy level greater than said metastable state and said selected wavelength corresponds to a difference in energy levels between said metastable state and said transition state;
   modulating means for forming a first path of said selected wavelength light at a variable intensity through said gas volume to populate said energy states and vary the index of refraction of said gas medium with said variable intensity; and transmission means for forming a second path of a second light at a selectable frequency through said gas volume and at least partially coincident with said first path for modulating said second light by said index of refraction of said gas medium.

5. A phase shifter according to claim 4, wherein said modulating means includes a dye laser tunable to said selected wavelength.

6. A phase shifter according to claim 4, wherein said first and second paths have diverging first and second axes respectfully.

7. A phase shifter according to claim 5, further including means for varying said intensity of said dye laser effective to phase modulate said second light along said second path coincident with said first path.

* * * * *